United States Patent
Delvaux et al.

(10) Patent No.: US 11,085,303 B1
(45) Date of Patent: Aug. 10, 2021

(54) PRESSURIZED DAMPING FLUID INJECTION FOR DAMPING TURBINE BLADE VIBRATION

(71) Applicant: General Electric Company, Schenectady, NY (US)

(72) Inventors: John McConnell Delvaux, Fountain Inn, SC (US); Claire Fridtjof Lang, Greenville, SC (US); Suryarghya Chakrabarti, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/902,343

(22) Filed: Jun. 16, 2020

(51) Int. Cl.
*F01D 5/22* (2006.01)
*F01D 5/16* (2006.01)
*F01D 25/06* (2006.01)

(52) U.S. Cl.
CPC .............. *F01D 5/16* (2013.01); *F01D 5/225* (2013.01); *F01D 25/06* (2013.01); *F05D 2220/31* (2013.01); *F05D 2220/3215* (2013.01); *F05D 2240/30* (2013.01); *F05D 2260/96* (2013.01)

(58) Field of Classification Search
None
See application file for complete search history.

(56) References Cited

U.S. PATENT DOCUMENTS

| | | | |
|---|---|---|---|
| 2,969,952 A * | 1/1961 | Stalker | F01D 5/30 416/140 |
| 2,970,809 A * | 2/1961 | Kroon | F01D 5/3053 416/140 |
| 3,893,782 A | 7/1975 | Pierpoline et al. | |
| 4,531,362 A | 7/1985 | Barry et al. | |
| 4,776,216 A | 10/1988 | Barton et al. | |
| 5,215,442 A | 6/1993 | Steckle et al. | |
| 5,256,031 A | 10/1993 | Bothien et al. | |
| 5,415,526 A * | 5/1995 | Mercadante | F01D 5/081 416/190 |
| 5,513,917 A * | 5/1996 | Ide | F16C 32/0666 384/100 |
| 6,171,058 B1 | 1/2001 | Stec | |
| 6,565,312 B1 * | 5/2003 | Horn | F01D 5/147 415/114 |
| 6,676,380 B2 | 1/2004 | Davis et al. | |
| 6,827,551 B1 | 12/2004 | Duffy et al. | |
| 8,157,507 B1 * | 4/2012 | Coffin | F01D 5/26 415/119 |
| 2007/0081894 A1 | 4/2007 | Garner | |

(Continued)

*Primary Examiner* — Michael Lebentritt
(74) *Attorney, Agent, or Firm* — James Pemrick; Hoffman Warnick LLC (57) ABSTRACT

A blade vibration damping system impacts a pressurized damping fluid on a surface of at least one of a plurality of blades of a turbine in opposition to a vibratory movement thereof to cause damping of vibration of the blade(s) during operation of the turbine. The system includes a fluid injection nozzle in a stationary component adjacent the plurality of blades. A valve selectively admits the pressurized damping fluid to the fluid injection nozzle from a source of pressurized damping fluid, and a control system controls the valve to operate the fluid injection nozzle in response to an operational parameter exceeding a threshold during operation of the turbine. A related turbine casing and method are also provided.

20 Claims, 6 Drawing Sheets

(56) References Cited

U.S. PATENT DOCUMENTS

| | | | |
|---|---|---|---|
| 2008/0213096 A1* | 9/2008 | Johnson Campino | ........................ F16J 15/027 416/174 |
| 2011/0158787 A1* | 6/2011 | Thacker, II | ............... H02P 9/04 415/1 |
| 2014/0079529 A1 | 3/2014 | Kareff et al. | |
| 2015/0292527 A1* | 10/2015 | Marger | ................... B64C 27/58 60/494 |
| 2015/0361801 A1* | 12/2015 | Blaney | ...................... F01D 5/26 416/232 |
| 2016/0258440 A1 | 9/2016 | Henry | |
| 2017/0067348 A1 | 3/2017 | Kareff et al. | |
| 2018/0052039 A1 | 2/2018 | Van Duyn et al. | |
| 2018/0340425 A1* | 11/2018 | Malmborg | ................ F01D 5/16 |

* cited by examiner

PRESSURIZED DAMPING FLUID INJECTION FOR DAMPING TURBINE BLADE VIBRATION

The invention was made under a U.S. Government contract Department of Energy (DOE) Contract Number DE-FE0031613 and the Government has rights herein.

BACKGROUND

The disclosure relates generally to turbines and, more particularly, to using a pressurized damping fluid injection for damping vibration of a turbine blade.

One concern in turbine operation is the tendency of the blades to undergo vibrational stress during operation. In many installations, turbines are operated under conditions of frequent acceleration and deceleration. During acceleration or deceleration of the turbine, the blades are, momentarily at least, subjected to vibrational stresses at certain frequencies and in many cases to vibrational stresses at secondary or tertiary frequencies. When a blade is subjected to vibrational stress, its amplitude of vibration can readily build up to a point that may alter turbine operations.

Turbine and compressor sections within an axial flow turbine generally include a rotor assembly comprising a rotating disk and a plurality of rotor blades circumferentially disposed around the disk. Each blade includes a root, an airfoil, and a platform positioned in the transition area between the root and the airfoil. The roots of the blades are received in complementary shaped recesses within the disk. The platforms of the blades extend laterally outward and collectively form a working fluid flow path for fluid passing through the rotor stage. The forward edge of each blade is generally referred to as the leading edge and the aft edge as the trailing edge. Forward is defined as being upstream of aft in the working fluid flow through the turbine.

During operation, blades may be excited into vibration by a number of different forcing functions. Variations in working fluid temperature, pressure, and/or density, for example, can excite vibrations throughout the rotor assembly, especially within the blade airfoils and/or tips. Gas exiting upstream of the turbine and/or compressor sections in a periodic, or "pulsating," manner can also excite undesirable vibrations.

In order to test vibrations in blades, one current test system uses piezo-actuated shuttlecock valves to create a high-speed ejection of an air pulse to excite/vibrate a blade to identify resonant frequencies of the blade. Another test system (see U.S. Pat. No. 4,776,216) for a steam turbine provides controllable fluid jets disposed about a blade row for exciting the rotating blades to identify resonant frequencies of the blades from the amplitude of vibration. This test system introduces steam pulses upstream of a blade stage (see e.g., the position of nozzles 18 relative to blades 22 in FIG. 2) and is used while the steam turbine is operating at a constant shaft rotational velocity. However, neither of the afore-mentioned test systems can correct for vibrations during actual operation of the turbine.

One approach to address vibrations during operation of the turbine includes changing physical structure of the blades to reinforce the blade against the vibrations. For example, a mid-span shroud that couples adjacent blades may be used. Changing or adding structure creates additional challenges by changing the aerodynamic performance of the blades and adding weight and/or length. In other approaches, mechanisms to passively absorb pressure that creates the vibrations during use are employed. In one example, cavities or, in another example, baffles, may be provided adjacent a tip of the blade to absorb pressure variations during operation. In another case, a high pressure airflow may be directed from an upstream position into a leading edge of a blade stage. This latter approach is limited in effectiveness because the airflow is only directed at a leading edge of the blades.

BRIEF DESCRIPTION

An aspect of the disclosure provides a casing for a turbine, comprising: a stationary component defining at least a portion of a working fluid path for directing a working fluid across a blade stage including a plurality of blades operatively coupled to a rotor; and a fluid injection nozzle in the stationary component configured to impact a pressurized damping fluid on a surface of at least one of the plurality of blades of the blade stage in opposition to a vibratory movement thereof to cause damping of vibration of the at least one of the plurality of blades during operation of the turbine.

Another aspect of the disclosure provides a blade vibration damping system for a turbine, the system comprising: a fluid injection nozzle in a stationary component adjacent a plurality of blades in the turbine, the fluid injection nozzle configured to impact a pressurized damping fluid on a surface of the at least one of the plurality of blades in opposition to a vibratory movement thereof to cause damping of vibration of the at least one of the plurality of blades during operation of the turbine; a valve for selectively admitting the pressurized damping fluid to the fluid injection nozzle from a source of pressurized damping fluid; and a control system for controlling the valve to operate the fluid injection nozzle in response to an operational parameter exceeding a threshold during operation of the turbine.

Another aspect of the disclosure provides a method, comprising: operating a turbine by transmitting a working fluid through a working fluid path defined between a stationary component of a casing and a rotor and across a plurality of blades operatively coupled to the rotor; and damping vibration of at least one of the plurality of blades during the operating of the turbine by impacting a pressurized damping fluid on a surface of the at least one of the plurality of blades in opposition to a vibratory movement thereof.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current technology, it will become necessary to select certain terminology when referring to and describing relevant machine components within turbines. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine.

It is often required to describe parts that are disposed at differing radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Embodiments of the disclosure include, among other things, a blade vibration damping system, a casing for a turbine including the damping system, and a related method. The blade vibration damping system impacts a pressurized damping fluid on a surface of at least one of a plurality of blades of a turbine in opposition to a vibratory movement thereof to cause damping of vibration of the blade(s) during operation of the turbine. The system includes a fluid injection nozzle in a stationary component adjacent the plurality of blades. A valve selectively admits the pressurized damping fluid to the fluid injection nozzle from a source of pressurized damping fluid, and a control system controls the valve to operate the fluid injection nozzle in response to an operational parameter exceeding a threshold during operation of the turbine. The operational parameter may include, for example, a vibration amplitude and a phase of vibration. The pressurized damping fluid may be injected in a pulsed flow, e.g., pulsed 180° out of phase with blade vibration, to counteract and damp the vibration. The fluid injection nozzle may be positioned in a stationary component defining at least a portion of a working fluid path for directing a working fluid across a blade stage including a plurality of blades operatively coupled to a rotor. The teachings of the disclosure are in contrast with current test systems that employ fluid injection to identify resonant frequency vibrations but are not used during actual operation of the turbine to damp vibrations.

Figure 1:
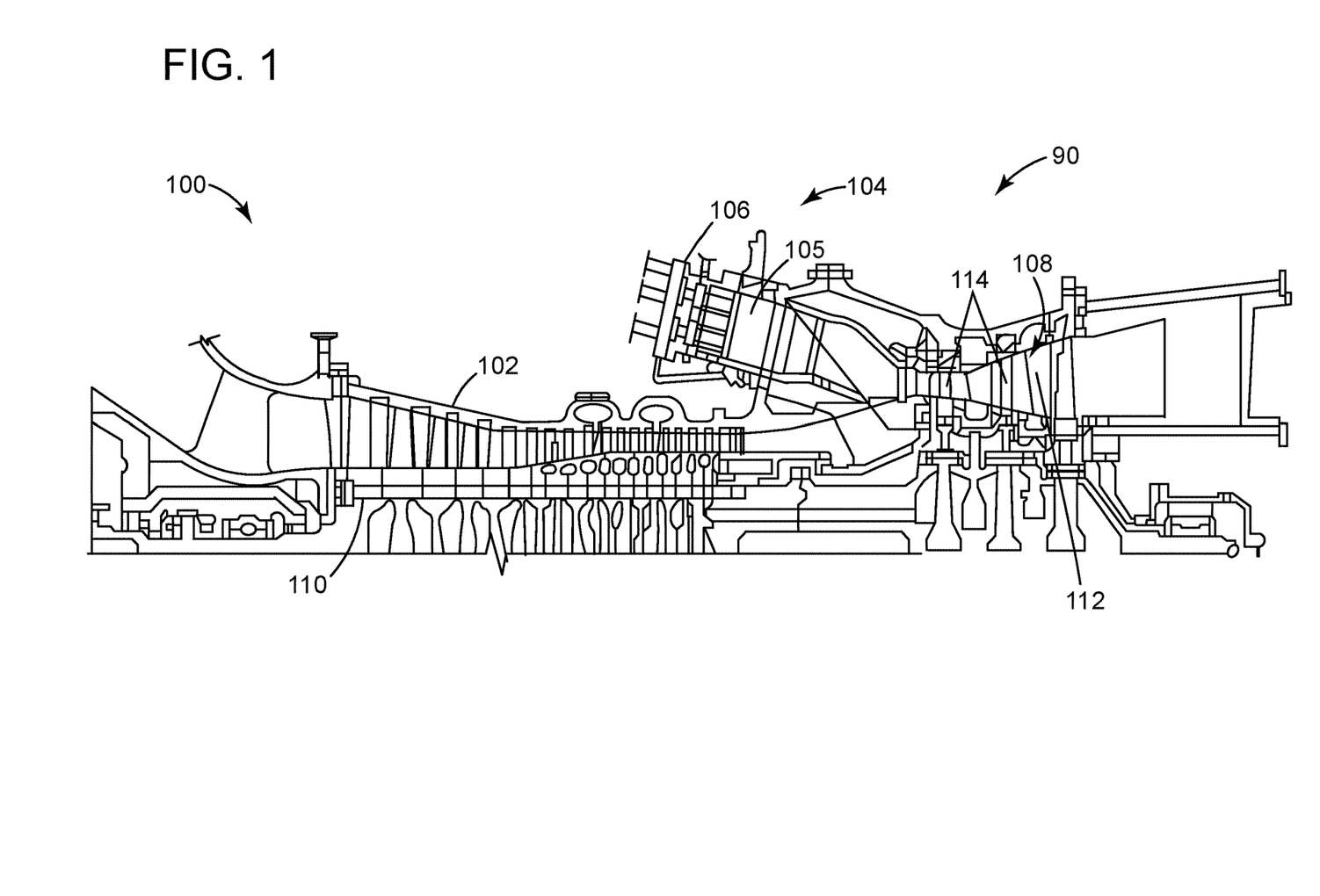
FIG. 1 shows a schematic view of an illustrative turbomachine in the form of a gas turbine system.

Referring to the drawings, FIG. 1 is a schematic view of an illustrative machine including a turbine(s) to which teachings of the disclosure can be applied. In FIG. 1, a turbomachine 90 in the form of a combustion turbine or gas turbine (GT) system 100 (hereinafter, "GT system 100"), is shown. GT system 100 includes a compressor 102 and a combustor 104. Combustor 104 includes a combustion region 105 and a fuel nozzle section 106. GT system 100 also includes a turbine 108 and a common compressor/turbine shaft 110 (hereinafter referred to as "rotor 110").

In one embodiment, GT system 100 is a 7HA.03 engine, commercially available from General Electric Company, Greenville, S.C. The present disclosure is not limited to any one particular GT system and may be implemented in connection with other engines including, for example, the other HA, F, B, LM, GT, TM and E-class engine models of General Electric Company and engine models of other companies. More importantly, the teachings of the disclosure are not necessarily applicable to only a turbine in a GT system and may be applied to practically any type of turbine, e.g., steam turbines, jet engines, compressors (as in FIG. 1), turbofans, turbochargers, etc. Hence, reference to turbine 108 of GT system 100 is merely for descriptive purposes and is not limiting.

Figure 2:
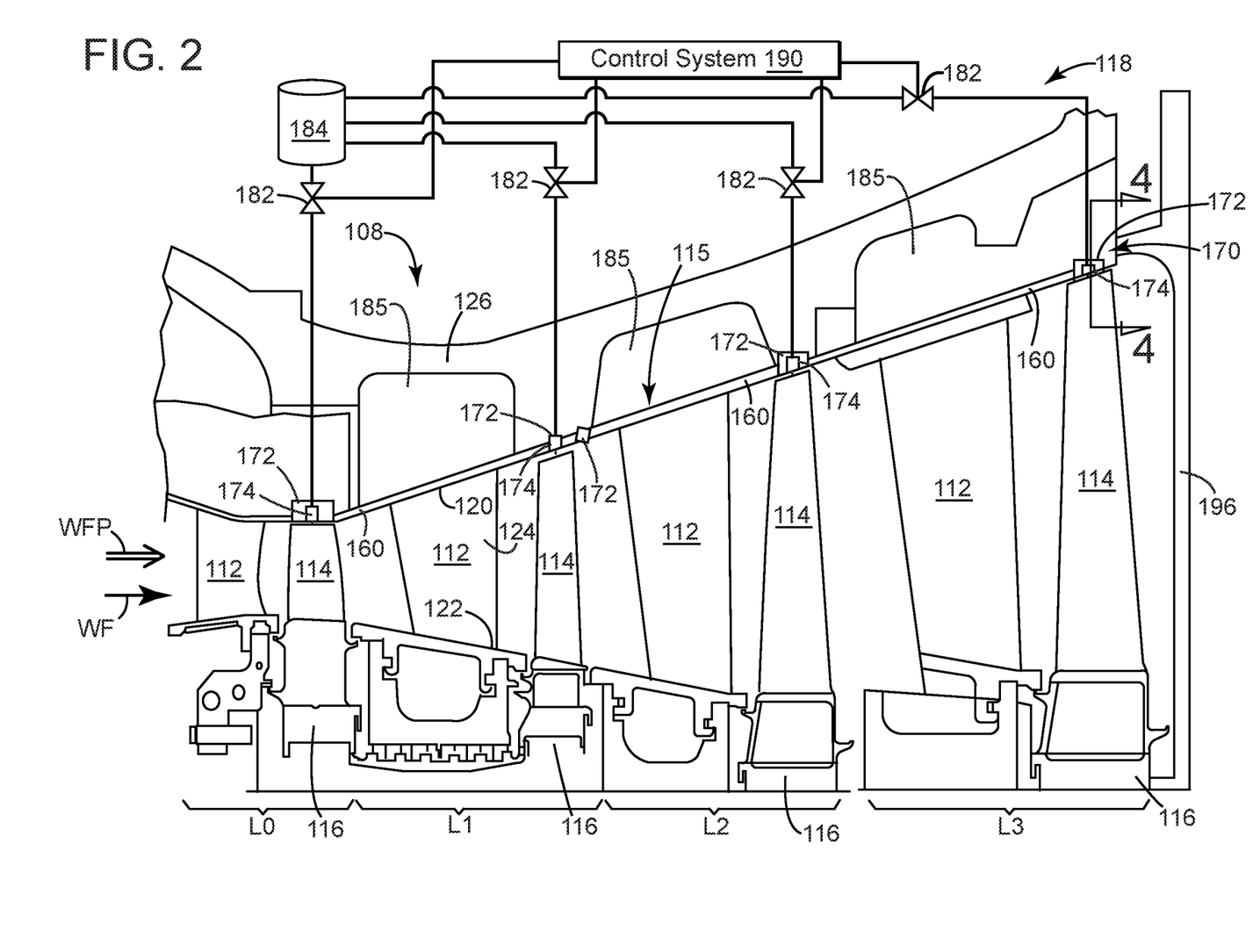
FIG. 2 shows a cross-sectional and partially schematic view of an illustrative turbine including a blade vibration damping system, according to embodiments of the disclosure.

FIG. 2 shows a cross-section and partially schematic view of an illustrative portion of turbine 108, including a blade vibration damping system 118 and a casing 126 including part of the system, according to embodiments of the disclosure. In the example shown, turbine 108 includes four stages L0-L3 that may be used with GT system 100 in FIG. 1. The four stages are referred to as L0, L1, L2, and L3. Stage L0 is the first stage and is the smallest (in a radial direction) of the four stages. Stage L1 is the second stage and is the next stage in an axial direction. Stage L2 is the third stage and is the next stage in an axial direction. Stage L3 is the fourth, last stage and is the largest (in a radial direction). It is to be understood that four stages are shown as one example only, and each turbine may have more or less than four stages.

A plurality of stationary vanes or nozzles 112 may cooperate with a plurality of rotating turbine blades 114 (hereafter "blades 114") to form each stage L0-L3 of turbine 108 and to define a portion of a working fluid path (WFP) through turbine 108. Blades 114 in each stage are coupled to rotor 110, e.g., by a respective rotor wheel 116 that couples them circumferentially to rotor 110. That is, blades 114 are mechanically coupled in a circumferentially spaced manner to rotor 110, e.g., by rotor wheels 116. Where provided, a static nozzle section 115 includes a plurality of stationary nozzles 112 circumferentially spaced around rotor 110. Each nozzle 112 may include at least one endwall (or platform) 120, 122 connected with an airfoil 124. In the example shown, nozzle 112 includes a radially outer endwall 120 and a radially inner endwall 122. Radially outer endwall 120 couples nozzle(s) 112 to a casing 126 of turbine 108. In some forms of turbine, nozzles 112 may be omitted.

Figure 3:
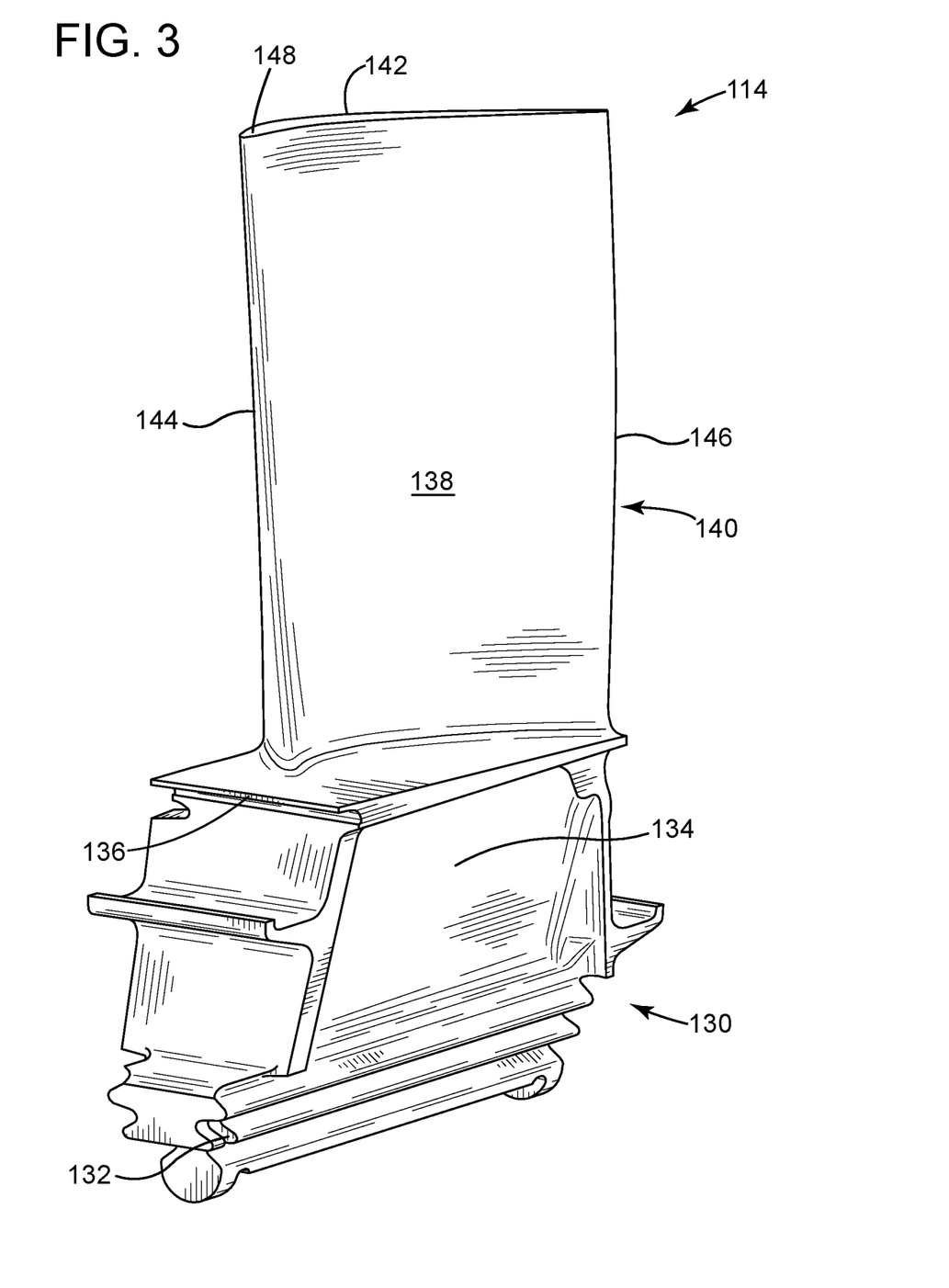
FIG. 3 shows a perspective view of a turbine rotor blade of the type in which embodiments of the present disclosure may be employed.

FIG. 3 shows a perspective view of a blade 114 of the type for which embodiments of the present disclosure may be employed. Each of the plurality of blades 114 includes a root 130 by which blade 114 attaches to rotor 110 (FIG. 1). Root 130 may include a dovetail 132 configured for mounting in a corresponding dovetail slot in the perimeter of a rotor wheel 116 (FIG. 2) of rotor 110 (FIG. 1). Root 130 may further include a shank 134 that extends between dovetail 132 and a platform 136, which is disposed at the junction of airfoil 138 and root 130 and which defines a portion of the inboard boundary of the working fluid path (WFP)(FIG. 2) through turbine 108. It will be appreciated that airfoil 138 is the active component of blade 114 that intercepts the flow of working fluid and that induces rotor 110 to rotate. It will be seen that airfoil 138 of blade 114 includes a concave pressure side (PS) outer wall 140 and a circumferentially or laterally opposite convex suction side (SS) outer wall 142 extending axially between opposite leading and trailing edges 144, 146 respectively. Sidewalls 140 and 142 also extend in the radial direction from platform 136 to an outer tip 148. While an illustrative blade 114 has been described, it will be appreciated that blades may vary in structure across different types of turbines.

Returning to FIG. 2, casing 126 may include a stationary component 160 defining at least a portion of working fluid path (WFP) for directing a working fluid (WF) across a blade stage (e.g., L0-L3) that includes a plurality of blades 114 operatively coupled to rotor 110. As noted, for GT system 100 (FIG. 1), the working fluid WF is combusted fuel. Other turbines may use other working fluids such as, but not limited to, steam, water, air, fuel or fuel/air mixture. Stationary component 160 may include any now known or later developed part of a casing for a turbine that forms working fluid path (WFP). In one non-limiting example, stationary component 160 may include a tip shroud that surround outer tips 148 (FIG. 3) of blades 114. In other embodiments, stationary component 160 may include a part of a nozzle section 115 extending circumferentially about plurality of blades 114, e.g., outer endwall 120 of an upstream or downstream nozzle section 115.

With reference to FIGS. 1 and 2, in operation, air flows through compressor 102, and pressurized air is supplied to combustor 104. Specifically, the pressurized air is supplied to fuel nozzle section 106 that is integral to combustor 104. Fuel nozzle section 106 is in flow communication with combustion region 105. Fuel nozzle section 106 is also in flow communication with a fuel source (not shown in FIG. 1) and channels fuel and air to combustion region 105. Combustor 104 ignites and combusts fuel. Combustor 104 is in flow communication with turbine 108 within which gas stream thermal energy is converted to mechanical rotational energy by directing the combusted fuel, e.g., working fluid, into the working fluid path (WFP) to turn blades 114. Turbine 108 is rotatably coupled to and drives rotor 110. Compressor 102 is rotatably coupled to rotor 110. At least one end of rotor 110 may extend axially away from turbine 108 and may be attached to a load or machinery (not shown), such as, but not limited to, a generator, a load compressor, and/or another turbine.

As noted, during operation of a turbine, blades 114 may be excited into vibration by a number of different forcing functions. Variations in, for example, working fluid temperature, pressure, and/or density can excite vibrations throughout the rotor assembly, especially within the blade airfoils and/or tips. Gas exiting upstream of the turbine and/or compressor sections in a periodic, or "pulsating," manner can also excite undesirable vibrations. Other common causes of turbine blade vibration may include, but are not limited to, wakes from upstream nozzles, low per revolution circumferential flow distortions from combustor cans, structural excitation from the generator, and turbine blade flutter.

Figure 4:
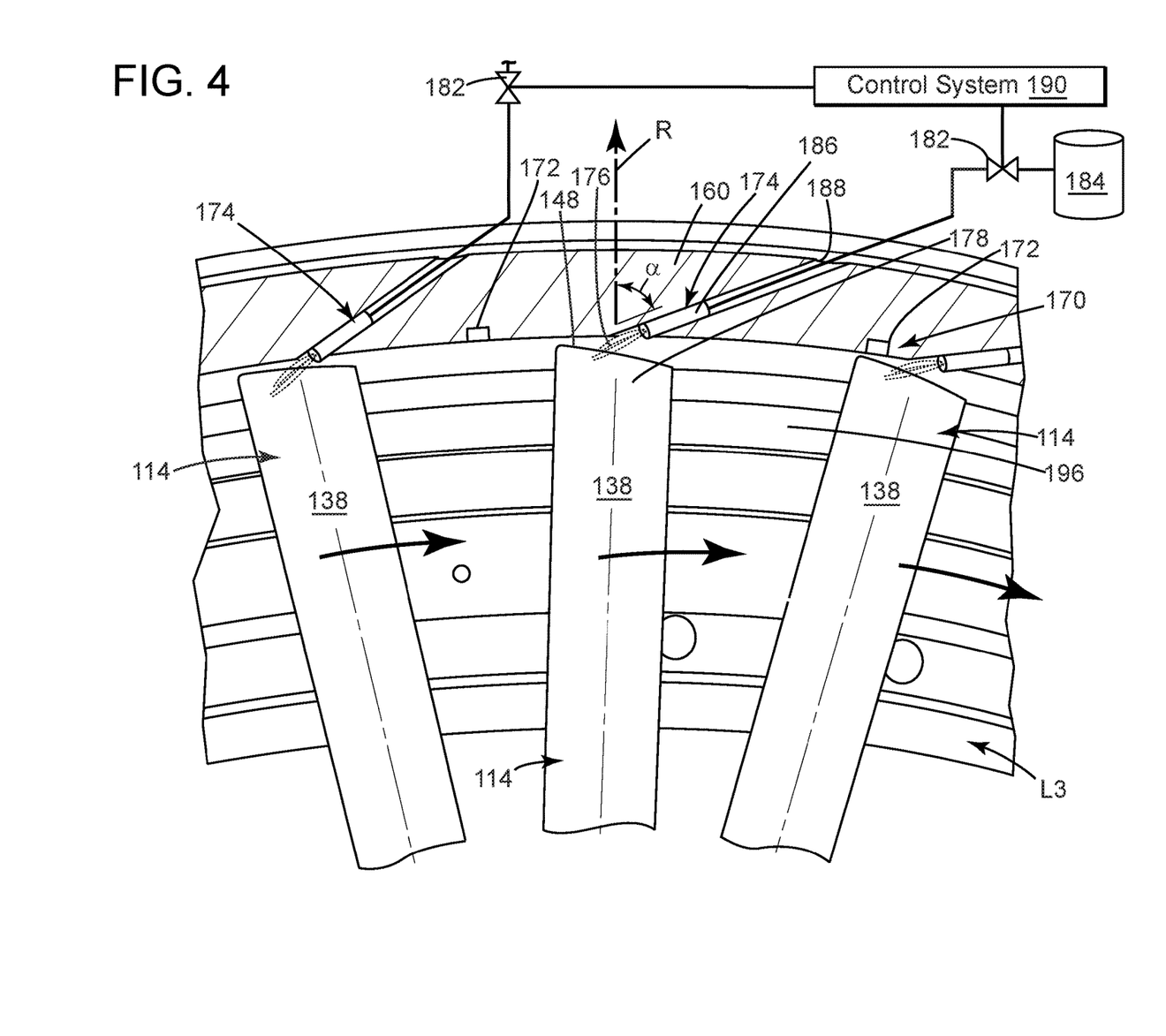
FIG. 4 shows a partially schematic and cross-sectional view, taken along line 4-4 in FIG. 2, of a blade vibration damping system in a casing, according to embodiments of the disclosure.

FIGS. 2 and 4 show a blade vibration damping system 118 (hereafter "system 118") for turbine 108, according to embodiments of the disclosure. FIG. 4 shows a partially schematic and cross-sectional view (taken along line 4-4 in FIG. 2) of system 118 and casing 126 for turbine 108. System 118 may also optionally include a sensor system 170 operatively associated with plurality of blades 114 in turbine 108. Sensor system 170 may be configured to, for example, determine an amplitude and a phase of vibration, or another operational parameter of at least one of plurality of blades 114. Sensor system 170 may include one or more sensors 172 coupled to stationary casing 126 in any location adjacent outer tip 148 of blades 114 for accurate vibration measurements. Any number of circumferentially spaced sensors 172 may be employed. The connections from sensor(s) 172 to a control system 190, described elsewhere herein, are well known and not shown. Sensor(s) 172 may be any of a variety of suitable sensors such as electromagnetic probes.

System 118 also may include a fluid injection nozzle 174 in stationary component 160 adjacent plurality of blades 114. Fluid injection nozzle 174 is configured to impact a pressurized damping fluid 176 on surface 178 of at least one of the plurality of blades 114 in opposition to a vibratory movement thereof to cause damping of vibration of at least one of the plurality of blades 114 during operation of the turbine. A used herein, "damping" indicates a decrease in the amplitude of an oscillation or vibration (e.g., a resonant frequency of a blade) by draining energy from the object, e.g., blade.

In many, but perhaps not all cases, the best positioning of fluid injection nozzle(s) 174 to dampen vibration is such that pressurized damping fluid 176 is injected in a direction perpendicular to surface 178. To this end, fluid injection nozzle(s) 174 can be angled within stationary component 160 in any manner to ensure pressurized damping fluid 176 impacts the desired surface at the desired angle of the relevant blade(s) 114. In one example shown in FIG. 4, fluid injection nozzle 174 may be angled at an angle α relative to a radial axis R to direct pressurized damping fluid 176 perpendicular to surface 178 of blade 114. Here, fluid injection nozzle 174 is within or parallel to a radial plane 192, i.e., plane of page that is perpendicular to axis of rotor 110 (FIG. 1).

Figure 5:
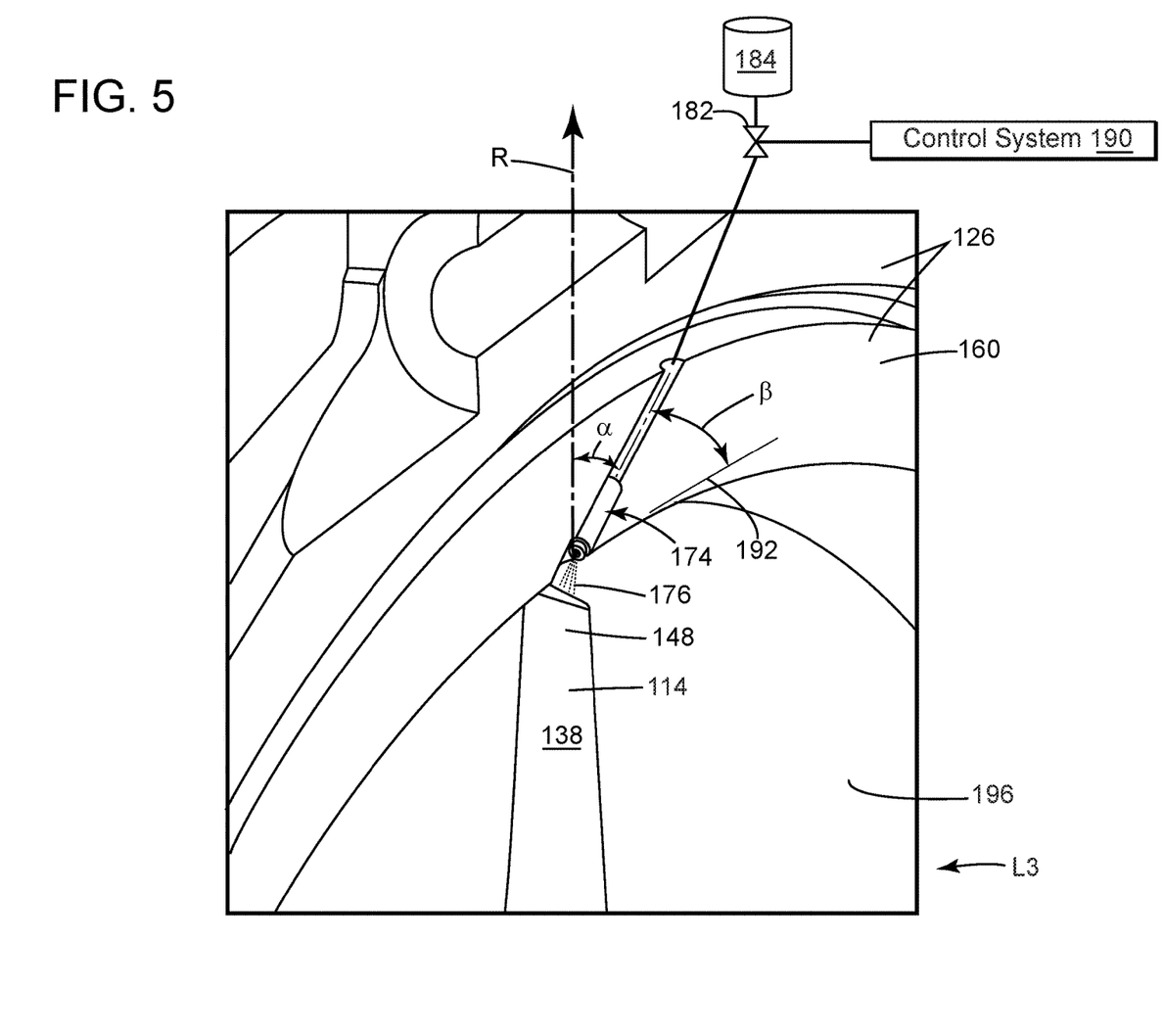
FIG. 5 shows a perspective view of a blade vibration damping system in a casing, according to other embodiments of the disclosure.

In another example shown in the perspective view of FIG. 5, fluid injection nozzle 174 is angled at an angle α relative to a radial axis R and at an angle β relative to a radial plane 192, i.e., plane perpendicular to axis of rotor 110 (FIG. 1), to direct pressurized damping fluid 176 perpendicular to surface 178 of blade 114.

In one example, fluid injection nozzle 174 is aimed at surface 178 of outer tip 148 of the at least one of the plurality of blades 114. In this setting, pressurized damping fluid 176 could also be employed, at least in part, to reduce over-tip leakage of the working fluid. In another example, surface 178 of blade(s) 114 may be that of airfoil 138 thereof, i.e., away from outer tip 148. However, surface 178 can be any surface of blade 114, e.g., as shown in FIG. 2, pressure side outer wall 140 or suction side outer wall 142 of airfoil 138.

In the example shown in FIG. 4, blades 114 rotate clockwise. In this case, pressurized damping fluid 176 is directed at suction side outer wall 142 of airfoil 138 in opposition to the rotation. It is emphasized, however, that pressurized damping fluid 176 may be directed in any direction, including in a direction of rotation, and to impact any blade surface to dampen vibration. Pressurized damping fluid 176 may include, for example, pressurized air, water, steam, or a combination thereof. While the impact angle has been described herein as perpendicular, other impact angles may also be employed.

Figure 6:
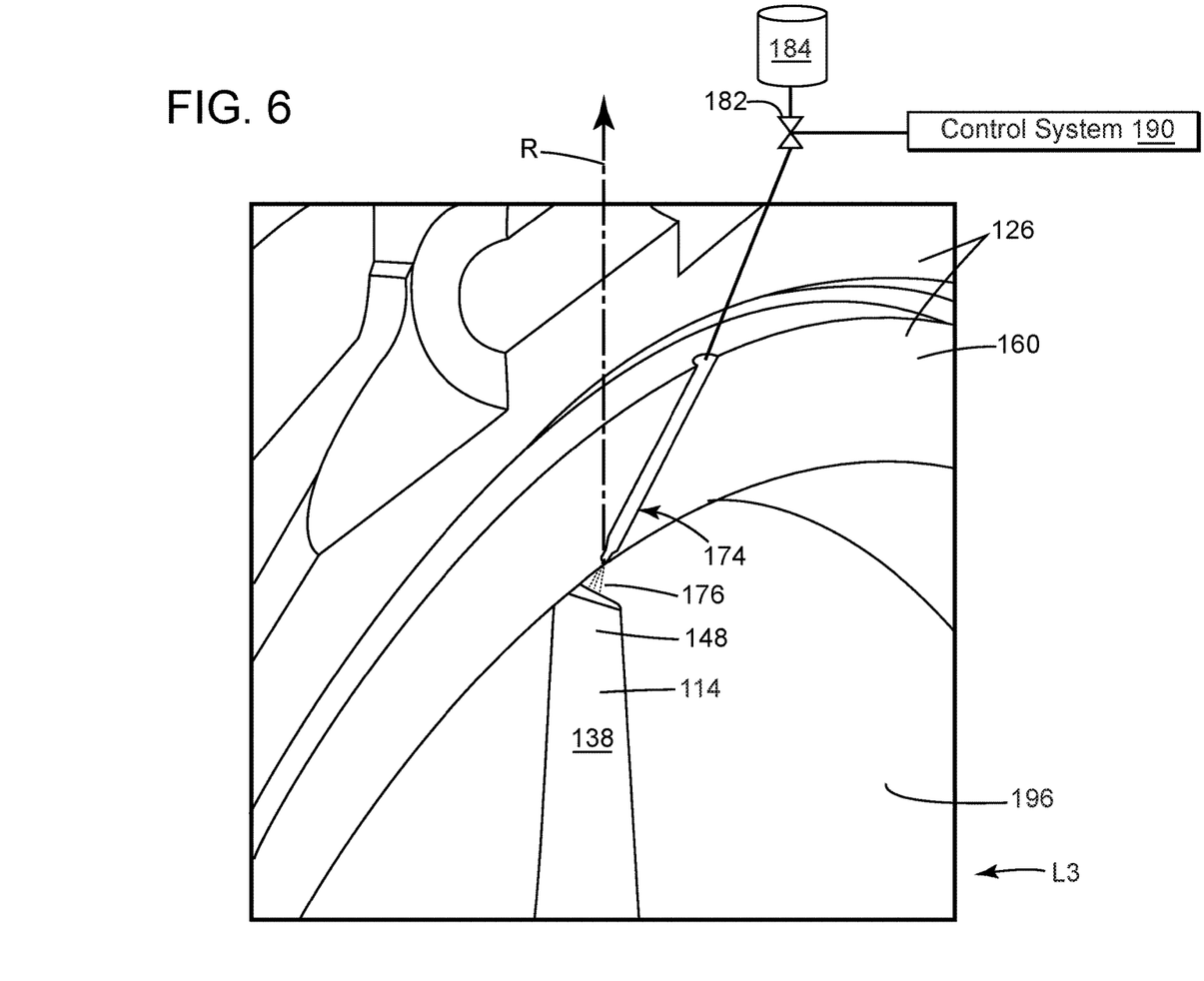
FIG. 6 shows a cross-sectional view of a fluid injection nozzle, according to alternative embodiments of the present disclosure.

Fluid injection nozzle(s) 174 may have any size commensurate with the size of turbine 108 and desired damping effect. As shown in FIGS. 4 and 5, fluid injection nozzle(s) 176 may include, for example, a nozzle insert 186 (fixed) in an opening 188 in stationary component 160. Alternatively, as shown in an enlarged, partial cross-sectional view in FIG. 6, fluid injection nozzle 174 may be integrally formed in stationary component 160, e.g., cast, additively manufactured, or machined therein. In any case, nozzles 174 can be configured to provide any shape and/or form to pressurized damping fluid 176 as it exits stationary component 160. In addition, system 118 can be implemented on new turbines 108 and, advantageously, can be retrofitted to older turbines 108, e.g., by drilling opening(s) 188 in stationary components 160 thereof and using nozzle inserts 186.

Fluid injection nozzle(s) 174 and sensor(s) 172 (where provided) may be axially aligned in a radial plane 192 (FIGS. 4 and 6) (see stages L0, L2 and L3 in FIG. 2), or they can be axially offset (see stage L1 in FIG. 2).

System 118 may also include a valve 182 for selectively admitting pressurized damping fluid 176 to fluid injection nozzle(s) 174 from a source of pressurized damping fluid 184 (hereafter "source 184"). Source 184 may be any now known or later developed supply appropriate for the pressurized damping fluid 176. In non-limiting examples, source 184 could be at least one of: a pressurized storage tank (e.g., water or air), a compressor 102 (FIG. 1) discharge (air), a cooling fluid supply 185 (e.g., air) to a nozzle section 115 upstream of the relevant blade stage, a heat recovery steam generator (HRSG) for steam, etc. Valve(s) 182 may be any appropriate valve for pressurized damping fluid 176 used, e.g., an electronically controllable ball valve for air.

System 118 may also include a control system 190 for controlling valve(s) 182 to operate fluid injection nozzle(s) 174 in response to an operational parameter of turbine 108 exceeding a threshold during operation of turbine 108. The operational parameter may be any now known or later developed parameter that may indicate that blade vibrations need to be addressed. In one non-limiting example, where sensor system 170 is provided, the operational parameter may be the amplitude and phase of vibration of at least one of the plurality of blades 114 as measured by sensor(s) 172. Here, control system 190 may operate valve(s) 182 in response to at least one of the amplitude and the phase of vibration of at least one of the plurality of blades exceeding a threshold during operation of the turbine. In particular, the phase of vibration can be used to time valve(s) 182 opening accurately to provide a counter flow to damp the vibrations, e.g., pulsed 180° out of phase with blade vibration to counteract and damp the vibration. In other non-limiting examples, the operational parameter could be any other parameter measured in turbine 108 such as but not limited to: working fluid temperature, pressure, and/or density; and/or identification of gas exiting upstream of turbine 108 and/or compressor 102 sections in a pulsating manner. The operational parameter can also be a combination of measurable parameters, e.g., working fluid temperature and density exceeding respective thresholds, working fluid pressure, and vibration amplitude of one or more blades 114 as measured by sensor system 170.

In one embodiment, fluid injection nozzle(s) 174 could be configured to continually impact a pressurized damping fluid 176 on surface 178 of blade(s) 114 of a blade stage to change the flow field about the blade stage (e.g., volume, flow rate, direction, etc.), to reduce the total dynamic excitation of blade(s) 114 during operation of turbine 108. In this case, valve(s) 182 would be in a continuously open position. In other embodiments, however, control system 190 can operate valve(s) 182 to provide pressurized damping fluid 176 in any selective manner desired. For example, in one embodiment, pressurized damping fluid 176 may be injected in a substantially constant flow, e.g., with some small closed period such as during startup of turbine 108. A constant flow is in contrast to conventional test systems that pulsate the flow to create the desired vibrations for testing and design purposes. In other embodiments, pressurized damping fluid 176 can be injected in an intermittent or pulsed manner to counteract a phase of the vibratory movement of the at least one of the plurality of blades of the blade stage. For example, it can be pulsed 180° out of phase with blade vibration. The duration of any type flow can also be controlled. Control system 190 can be any now known or later developed digital controller and can be a standalone controller or incorporated in a larger control system, e.g., for the overall control of turbine 108 or turbomachine 90 (FIG. 1).

As shown in FIG. 4, embodiments of the disclosure may optionally include a plurality of fluid injection nozzles 174 circumferentially spaced in stationary component 160. In this case, each fluid injection nozzle 174 may include a respective valve 182 for selectively admitting the pressurized damping fluid 176 to the nozzle from source of pressurized damping fluid 184 under control of control system 190. However, it may be possible that one valve 182 may control flow to more than one nozzle 174. In any event, control system 190 opens at least one valve 182 to operate at least one respective fluid injection nozzle 174 in response to, as described herein, an operational parameter, e.g., amplitude of vibration of at least one of the plurality of blades, exceeding a threshold during operation of the turbine. Any number of fluid injection nozzles 174 may be employed as part of system 118.

As shown in FIG. 2, rotor 110 may include a plurality of blade stages L0-L3. While each blade stage is shown as including system 118, that arrangement may not always be necessary. For example, only selected blade stages may include system 118. In one example, as shown in FIGS. 4 and 5, blade(s) 114 are adjacent a casing endwall 196 of casing 126 and thus may be part of only a last (largest) stage of blade stages L0-L3.

Embodiments of the disclosure may also include casing 126 for turbine 108 that includes fluid injection nozzle 174 in stationary component 160 thereof. Further, casing 126 may include valve(s) 182 (coupled thereto or external thereto) for selectively admitting the pressurized damping fluid 176 to fluid injection nozzle(s) 174 from source of pressurized damping fluid 184. Casing 126 could also include control system 190 (coupled thereto or external thereto) that opens valve(s) 182 to operate fluid injection nozzle(s) 174 in response to an operational parameter of the turbine, as described herein, exceeding a threshold.

In operation, a method according to embodiments of the disclosure includes operating turbine 108. In contrast to test systems, embodiments of the disclosure are applied to turbine 108 during actual, active operation in which turbine 108 is generating its built-for output, e.g., rotational power, compressed air, compressed air/fuel mixture, etc. Turbine 108 may be operated at any load and/or speed in which blade vibration may be a concern. Turbine 108 may be operated by transmitting a working fluid through a working fluid path (WFP)(FIG. 2) defined between stationary component 160 of casing 126 and rotor 110 and across a plurality of blades 114 operatively coupled to rotor 110. The method also includes, as described herein, damping vibration of at least one of blades 114 during the operating of turbine 108 by impacting pressurized damping fluid 176 on surface 178 of at least one of blades 114 in opposition to a vibratory movement thereof. As described, the damping may include, during the operating of turbine 108, selectively operating valve(s) 182 configured to selectively admit the pressurized damping fluid 176 from source 184 to fluid injection nozzle(s) 174 configured to impact pressurized damping fluid 176 on surface 178 of at least one of blades 114. Any number of blades 114 may have their vibration simultaneously damped during the operation of turbine 108 by impacting pressurized damping fluid 176 on a surface 178 of each of the plurality of blades.

Embodiments of the disclosure provide systems and methods of selectively damping vibration in one or more turbine blades during operation of the turbine. The teachings are applicable to any variety of turbine: jet engines, steam or gas turbines, compressors, turbochargers, etc. Damping turbine stage(s) and/or blade(s) in this manner helps to extend the life of the blades, to allow use of larger blades, to produce more power, and to improve efficiency. In addition, damping turbine stage(s) and/or blade(s) may allow elimination of tip-span and mid-span shrouds that would otherwise be used to reduce vibration. Embodiments of the disclosure also do not add any mass to the blade, unlike other blade dampers that add dead weight to the blade and suffer from durability concerns from exposure to high temperatures, centrifugal loading and blade vibrations.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" as applied to a particular value of a range applies to both end values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. A casing for a turbine, comprising:
   a stationary component defining at least a portion of a working fluid path for directing a working fluid across a blade stage including a plurality of blades operatively coupled to a rotor; and
   a fluid injection nozzle in the stationary component configured to impact a pressurized damping fluid on a surface of at least one of the plurality of blades of the blade stage in opposition to a vibratory movement thereof to cause damping of vibration of the at least one of the plurality of blades during operation of the turbine.

2. The casing of claim 1, further comprising:
   a valve for selectively admitting the pressurized damping fluid to the fluid injection nozzle from a source of pressurized damping fluid; and a control system for controlling the valve,
wherein the control system opens the valve to operate the fluid injection nozzle in response to an operational parameter of the turbine.

3. The casing of claim 2, wherein the pressurized damping fluid is injected in a substantially constant flow, changing a flow field about the blade stage.

4. The casing of claim 2, wherein the pressurized damping fluid is injected in a pulsed flow counteracting a phase of the vibratory movement of the at least one of the plurality of blades of the blade stage.

5. The casing of claim 2, wherein the fluid injection nozzle includes a plurality of fluid injection nozzles circumferentially spaced in the stationary component, each fluid injection nozzle including a respective valve for selectively admitting the pressurized damping fluid to the fluid injection nozzle from the source of pressurized damping fluid under control of the control system, and further comprising:
a sensor system operatively associated with the plurality of blades for determining an amplitude and a phase of vibration of the at least one of the plurality of blades, and
wherein the control system opens at least one valve to operate at least one respective fluid injection nozzle in response to at least one of the amplitude and the phase of vibration of the at least one of the plurality of blades exceeding a threshold during operation of the turbine.

6. The casing of claim 1, wherein the stationary component includes a tip shroud extending circumferentially about the plurality of blades.

7. The casing of claim 1, wherein the stationary component includes a part of a nozzle section extending circumferentially about the plurality of blades.

8. The casing of claim 1, wherein the fluid injection nozzle is aimed at the surface of an outer tip of the at least one of the plurality of blades.

9. The casing of claim 1, wherein the pressurized damping fluid includes at least one of pressurized air, water, steam, or a combination thereof.

10. The casing of claim 1, wherein the rotor includes a plurality of blade stages, and wherein the at least one of the plurality of blades is part of a last stage of the plurality of blade stages.

11. The casing of claim 1, wherein the surface of the at least one of the plurality of blades is an airfoil of the at least one of the plurality of blades, and the fluid injection nozzle is positioned to inject the pressurized damping fluid in a direction perpendicular to the surface.

12. The casing of claim 1, wherein the fluid injection nozzle includes a nozzle insert in an opening in the stationary component.

13. The casing of claim 1, wherein the fluid injection nozzle is integrally formed in the stationary component.

14. A blade vibration damping system for a turbine, the system comprising:
a fluid injection nozzle in a stationary component adjacent a plurality of blades in the turbine, the fluid injection nozzle configured to impact a pressurized damping fluid on a surface of at least one of the plurality of blades in opposition to a vibratory movement thereof to cause damping of vibration of the at least one of the plurality of blades during operation of the turbine;
a valve for selectively admitting the pressurized damping fluid to the fluid injection nozzle from a source of pressurized damping fluid; and
a control system for controlling the valve to operate the fluid injection nozzle in response to an operational parameter exceeding a threshold during operation of the turbine.

15. The system of claim 14, wherein the pressurized damping fluid is injected in a substantially constant flow.

16. The system of claim 14, wherein the fluid injection nozzle includes a plurality of fluid injection nozzles circumferentially spaced in the stationary component, each fluid injection nozzle including a respective valve for selectively admitting the pressurized damping fluid to the fluid injection nozzle from the source of pressurized damping fluid under control of the control system,
wherein the control system opens at least one valve to operate at least one respective fluid injection nozzle in response to an amplitude of vibration of the at least one of the plurality of blades exceeding the threshold during operation of the turbine.

17. The system of claim 14, wherein the fluid injection nozzle is aimed at the surface of an outer tip of the at least one of the plurality of blades.

18. The system of claim 14, further comprising a sensor system operatively associated with a plurality of blades in the turbine, the sensor system configured to determine an amplitude and a phase of vibration of the at least one of the plurality of blades, and
wherein the operational parameter includes at least one of the amplitude of vibration and the phase of vibration of the at least one of the plurality of blades exceeding a threshold during operation of the turbine.

19. A method, comprising:
operating a turbine by transmitting a working fluid through a working fluid path defined between a stationary component of a casing and a rotor and across a plurality of blades operatively coupled to the rotor; and
damping vibration of at least one of the plurality of blades during the operating of the turbine by impacting a pressurized damping fluid on a surface of the at least one of the plurality of blades in opposition to a vibratory movement thereof.

20. The method of claim 19, wherein the damping includes, during the operating the turbine, selectively operating a valve configured to selectively admit the pressurized damping fluid from a source of pressurized damping fluid to a fluid injection nozzle configured to impact the pressurized damping fluid on the surface of the at least one of the plurality of blades.

* * * * *